United States Patent [19]

Castellani et al.

[11] Patent Number: 4,770,643

[45] Date of Patent: Sep. 13, 1988

[54] IN-FLOOR FITTING

[75] Inventors: Norman Castellani, 5 Vermont Dr., Paramus, N.J. 07652; Robert C. Holland, Emerson, N.J.

[73] Assignees: Norman Castellani, Paramus; Robert Holland, Emerson; Raceway Components, Nutley, all of N.J.

[21] Appl. No.: 895,051

[22] Filed: Aug. 11, 1986

[51] Int. Cl.4 ............................................ H01R 13/44
[52] U.S. Cl. ...................................... 439/135; 174/48; 174/67; 439/142
[58] Field of Search ....................... 52/221; 174/48, 49, 174/67; 220/241, 242; 339/36; 439/44 R, 44 M, 135, 142–145

[56] References Cited

U.S. PATENT DOCUMENTS

| | | | |
|---|---|---|---|
| 3,864,883 | 2/1975 | McMarlin | 174/48 |
| 4,091,231 | 5/1978 | Sotolongo | 174/48 |
| 4,289,921 | 9/1981 | Gartner et al. | 339/44 M |
| 4,477,694 | 10/1984 | Kohaut | 174/48 |
| 4,573,297 | 3/1986 | Benscoter et al. | 174/48 |
| 4,591,656 | 5/1986 | Mohr | 174/48 |
| 4,603,229 | 7/1986 | Menchetti | 439/135 |

Primary Examiner—Gil Weidenfeld
Assistant Examiner—Paula A. Austin
Attorney, Agent, or Firm—Drucker & Sommers

[57] ABSTRACT

A fitting is provided for enabling a plurality of high and low voltage conductors to be activated thereby at a selected in-floor location therefor. A substantially flush top portion of the in-floor fitting enables efficient access to receptacles pre-wired for enabling connection of high voltage conductors thereto, and prevents tripping thereon. Fire retarding elements mounted in the fitting retard and prevent transmission of excess heat and flame through the fitting and through the floor opening in which the fitting is adapted to be mounted. Movable side plates in the substantially flush top portion of the fitting are automatically biased together so as to cover the top high voltage conductor outlet portion of the fitting when not in use, and are adapted to be readily separated such that openings therein are aligned with openings in the top outlets enabling connection of high voltage conductors thereto. Channels formed in the side portions of the fitting are adapted to receive low voltage conductors retrofitted or fitted thereinto, for low voltage activation thereof.

16 Claims, 3 Drawing Sheets

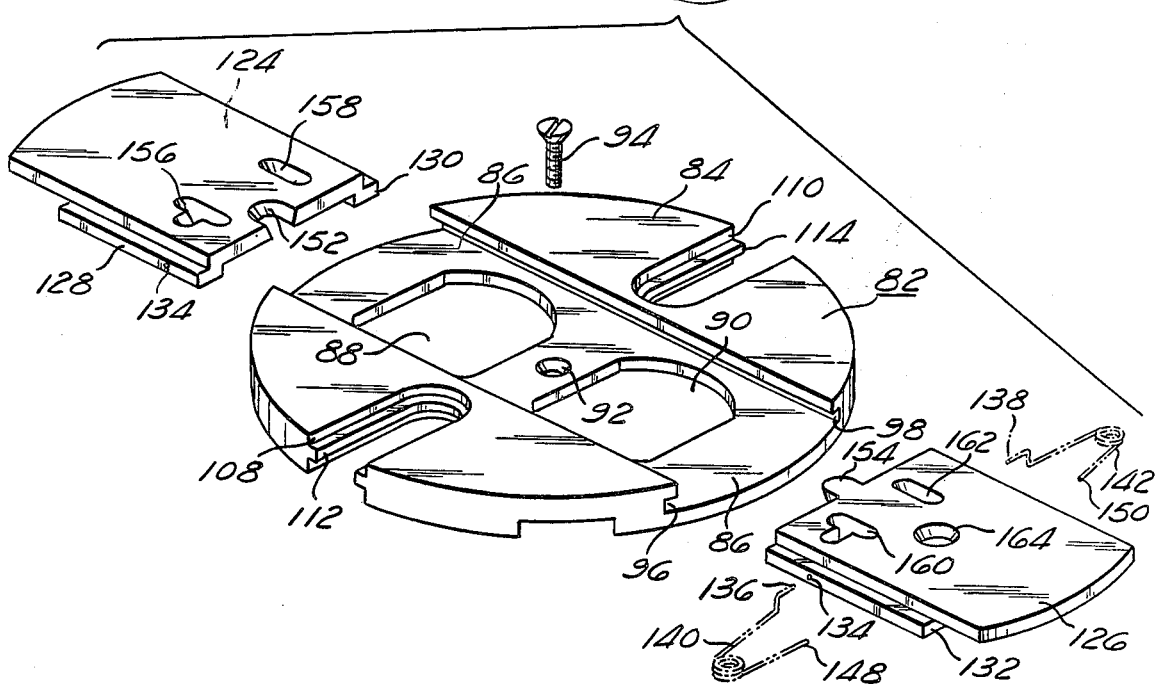
Fig. 4
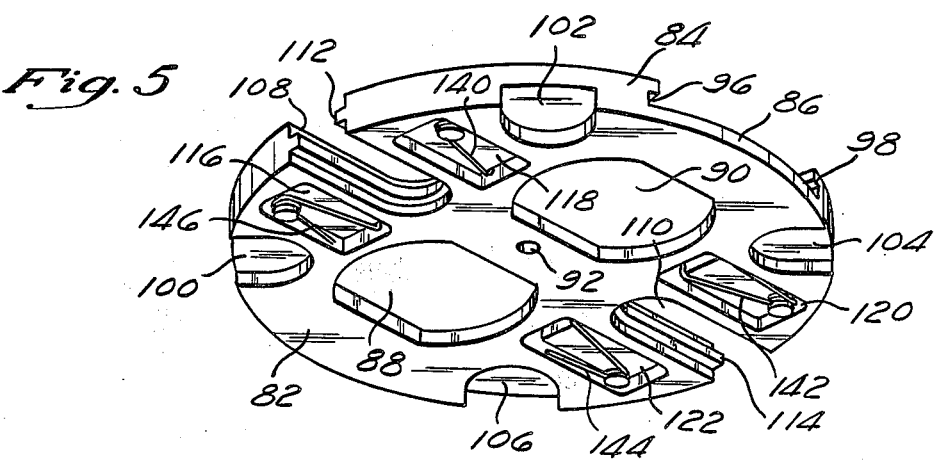
Fig. 5
Fig. 6

IN-FLOOR FITTING

BACKGROUND OF THE INVENTION

The invention relates generally to in-floor fittings, and relates specifically to an in-floor fitting for enabling high and/or low voltage conductors to be activated thereby at a selected floor location.

When a location for activation of high and/or low voltage conductors is selected, in a floor of a new or existing structure, as at or adjacent to the location of a desk or table in an office in an office building, an opening may be formed in such floor at such location, a fitting may be mounted in the floor opening, and under-floor high and/or low voltage conductors may be pulled through such fitting. A box-like, doghouse-type, above-floor service fitting may then be connected to the top of the in-floor fitting, and the under-floor conductors may then be connected to such service fitting to provide outlets for such high and/or low voltage conductors. The floor in which the fitting is positionable may be adapted to be fire-rated.

The opening through the floor, and the fitting mounted therein, provide a path for through-floor transmission of excess heat or flame from a fire occuring in the floor therebelow, thereby compromising the fire rating of the floor, and creating a serious hazard of enabling a fire to spread therethrough. Further, the box-like service fitting projects above the floor, creating a hazardous and unsightly obstruction in the floor.

In order to provide in-floor high and low voltage outlets and to prevent obstruction of the floor, it has been known in the art to provide a fitting, the top portion of which when closed extends in a plane generally parallel to the top of a carpet, which fitting accommodates high and low voltage conductors, as in U.S. Pat. No. 4,237,666. It has been further known in such type of fitting to prevent the transmission of fire or excess heat through the interior thereof, as in U.S. Pat. No. 3,864,883.

However, such in-floor fittings have not been as effective and efficient as possile.

In U.S. Pat. Nos. 3,864,883 and 4,237,666, in order to enable conductor outlets to be wired, and high and/or low voltage conductors to be connected to such outlets in the in-floor fitting, access is required through the top portion, into the recessed medial portion thereof. In such recessed medial portion, a receptacle may be wired for enabling connection of high voltage conductor plugs thereto, and a connector may be wired for enabling connection of low voltage conductors thereto. Such recessed outlets are inaccessible for wiring thereof and for connection of conductors thereto.

Further, the access housing therein forms a continuous channel, from under the floor directly through the floor, for direct transmission therethrough, and through the floor opening thereabout in which such access housing is mounted, of excess heat or flame, in the event of a fire in the floor below, substantially reducing the fire-retarding capabilities and increasing the fire transmission hazards in the use of such access housings.

SUMMARY OF THE INVENTION

The fitting of the invention is adapted to overcome the above problems, as well as others, associated with known devices.

It includes a substantially flush outlet section located in the top portion thereof, adapted to enable connection of high and/or low voltage conductors thereto, without recessed in-floor outlets therefor, and without an above-floor box-like doghouse-type service fitting. Such substantially flush outlets enable convenient and efficient access thereto for connection of high and/or low voltage conductors, prevent floor obstruction thereby, and provide an aesthetically appealing top surface thereof.

The fitting further includes fire retarding elements, located between sections of the fitting so as to be exposed to the floor opening and to the conductors adapted to pass through the fitting. The fire retarding elements are adapted to be activated in stages upon exposure to excess heat or flame, to retard and prevent transmission of such excess heat or flame through the fitting and through the floor opening in which the fitting is adapted to be located. They are thereby further adapted to enable the fire rating of the floor with the floor opening formed therein and the fitting positioned in such floor opening to be substantially the same as the fire rating of the floor without the floor opening formed therein.

The fitting still further includes elements, mounted in the top portion thereof, adapted to be biased so as to automatically cover the top substantially flush outlets for the high voltage conductors when not in use, without requiring an abandonment plate therefor. The biased elements are further adapted to be readily separated such that openings therein are aligned with openings in such top outlets, for enabling convenient connection of high voltage conductors thereto.

Channels are formed by alignable openings in the side portions of the elements of the fitting, which channels are adapted to enable snap-fit insertion of low voltage conductors therein, for enabling retrofitting or fitting of such conductors so as to pass through such fitting.

BRIEF DESCRIPTION OF THE DRAWINGS

FIG. 4 is a top perspective exploded view of a slide holder and slide plates in the top portion of the fitting;

FIG. 5 is a bottom perspective view of the slide holder of the top portion of the fitting; and FIG. 6 is a top perspective exploded view of ring-type grommets and slot closures of the top portion of the fitting.

DESCRIPTION OF THE PREFERRED EMBODIMENT

Figure 1:
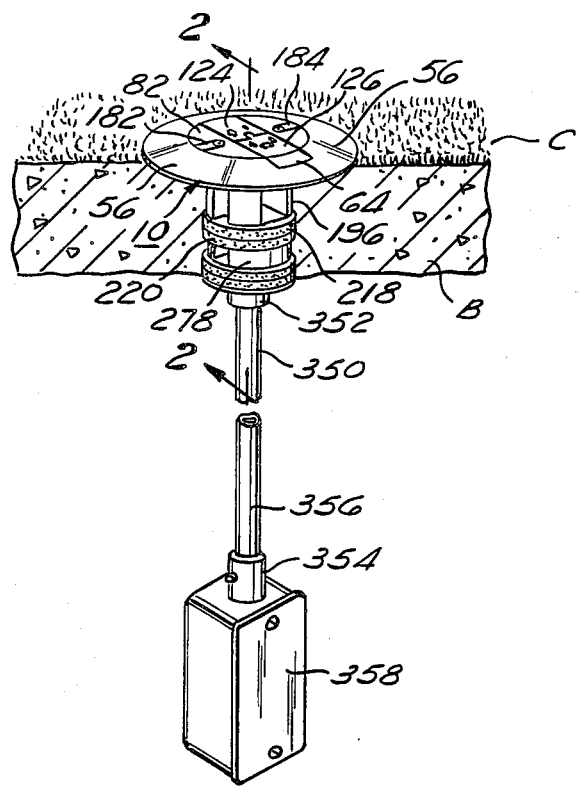
FIG. 1 is a perspective partly-fragmentary partly-sectional view of a fitting pursuant to the invention, installed in a floor opening.

The device of the invention, as shown in FIGS. 1-6 and as described herein, comprises a fitting 10, which enables at least one conductor to extend thereto or therethrough, from a source thereof, to or through a floor opening in which fitting 10 is positionable.

Fitting 10 is adapted for use in enabling activation in a new structure, or retrofitted activation in an existing structure, of a selected location of an opening, as A, which may be formed in a floor, as B, adapted to be fire-rated. Floor B includes a top level D thereof. In the preferred embodiment, as shown in the Figures, fitting 10 is a full service, full capacity unit, for dual service in a single three-inch floor opening, including a 15 amp (known in the trade as "5262") or 20 amp (known in the trade as "5362"), 125 volt duplex receptacle for connection of high voltage power conductors thereto, and further including two individual openings for extension of low voltage telephone, signal, or data communications conductors therethough. A plurality of conductors, for example a pair of high voltage and a pair of low tension conductors, are extendable from an underfloor source thereof to or through fitting 10, and thereby to or through floor opening A in which such fitting is positionable, to the top of fitting 10.

The top of fitting 10 is adapted to extend above the floor substantially flush with the top of a carpet C adapted to be installed on floor B. The substantially flush top of fitting 10 provides an outlet for such conductors, for activation of devices adapted to be activated thereby, without a box-like doghouse-type above-floor service fitting therefor. Fitting 10 may further properly be described as recessed, in that the receptacle therein is adapted to be recessed below the top level D of finished floor B.

Fitting 10 is further adapted to enable the fire rating of floor B with floor opening A formed therein to be substantially the same as the fire rating of floor B without floor opening A formed therein, so as to withstand excess heat and fire and prevent through-floor transmission thereof.

Fitting 10, as shown in FIGS. 1 and 3-5, includes a top portion, adapted to extend above the floor substantially flush with the top of carpet C. The top portion of fitting 10 includes a finish flange section, which includes a generally disk-shaped flange plate 12, having a pair of side generally C-shaped slots 14 and 16 through which low voltage conductors may extend. Flange plate 12 further includes end recessed planar portions 18 and 20, each of which has an opening 22 and 24 therein, a medial elongated opening 26, and diagonally-offset openings 28 and 30 therein.

A receptacle 32 in the finish flange section of the top portion of fitting 10 is adapted to depend into flange plate medial opening 26, and to be supported at the opposed ends thereof on flange plate planar portions 18 and 20. Receptacle 32 is a standard-size receptacle, which preferably includes a rugged high-strength track-resistant and arc-resistant housing with heavily plated contacts. It includes a pair of outlets 34 and 36, adapted to receive plugs at the ends of high voltage conductors extending from electrically-activated devices such as computers, typewriters, desk lamps, clocks, or the like. Receptacle 32 further includes end planar portions 38 and 40, each of which includes a slot 42 and 44 therein. Screw terminals 46, 48 and 50 extend from one side of receptacle 42, to which pre-wired leads, as 47, 49, and 51 may be connected. Screws 52 and 54 are adapted to extend through receptacle end slots 42 and 44 and into flange plate openings 22 and 24 to enable receptacle 32 to be threadably secured to flange plate 12.

The finish flange section of the top portion of fitting 10 further includes a finishing ring 56 which is generally disk-shaped, and which includes a central circular opening 58, and a circular flange portion 60. Finishing ring 56 further includes leg portion 59 which, upon installation of fitting 10 in floor opening A, is seated upon the top D of finished floor B. Finishing ring 56 may be finished with a textured outer surface, and may be custom-painted to blend in with carpet C. It may further be electroplated so as to provide a metallic finish such as brass, bronze, or aluminum. It further includes opposed recessed flat portions 62 and 64, and radially-projecting support portions 66, 68, 70 and 72 which may have openings 74, 76, 78 and 80 therein, adapted to receive screws for threadably connecting finishing ring 56 to flange plate 12.

A slide holder 82 in the top portion of fitting 10, as shown in FIGS. 3-6, is adapted to fit into central circular opening 58 of finishing ring 56. Slide holder 82 is preferably comprised of a rugged polycarbonate in a textured ebony-colored finish. It includes a generally disk-shaped body portion 84, which has a medial elongated slot-shaped channel portion 86 including a pair of openings 88 and 90 adapted to receive projecting receptacle outlets 34 and 36. It further includes a central opening 92 through which a screw 94 is extendable so as to be threadably connected with an opening in receptacle 32, for enabling slide holder 82 to be secured to receptacle 32. A pair of side tracks 96 and 98 are provided in the bottom portion of slide holder channel portion 86.

Slide holder 82 in the top portion of fitting 10 is further adapted to be supported on support portions 66, 68, 70 and 72 of finishing ring 56. It includes generally C-shaped peripheral recesses 100, 102, 104 and 106 in the bottom thereof, complementary to, and adapted to fit over, finishing ring support portions 66, 68, 70 and 72. Slide holder 82 further includes generally C-shaped outwardly-opening side slots 108 and 110, extending generally perpendicular to channel portion 86, each of which side slots 108 and 110 includes a medial flange 112 and 114 extending therein, and recesses 116, 118, 120 and 122 in the bottom thereof.

A pair of slide plates 124 and 126 are adapted to be slidably movable in slide holder channel portion 86 of slide holder 82 in the top portion of fitting 10. Each slide plate 124 and 126 includes side outwardly-projecting portions, as 128, 130 and 132, complementary to, and slidably movable in, slide holder side tracks 96 and 98. Each such projecting portion, as 128, 130 and 132, has an opening, as 134 therein, adapted to receive therein one end, as 136 and 138, of a spring, as 140, 142, 144 and 146. Springs 140, 142, 144 and 146 are adapted to be received in recesses 116, 118, 120 and 122, in the bottom of slide holder 82 such that the other end, as 148 and 150, of each spring 140, 142, 144 and 146, bears against a side wall of each such slide holder recess 116, 118, 120 and 122, to normally bias slide plates 124 and 126 into engagement with each other.

Slide plate 124 has a slot portion 152, and slide plate 126 has a complementary interfittable projecting portion 154 in the facing portions thereof. Slide plate 124 further includes therein openings, as 156, 158, and the opening formed by slot portion 152 upon moving slide plate 124 away from projecting portion 154 of slide plate 126, and slide plate 126 further includes openings, as 160, 162 and 164 therein, arranged to correspond to the arrangement of the connector prongs in high voltage plugs, and adapted to be alignable with corresponding openings in the receptacle outlets 34 and 36 for enabling connection of such plugs to receptacle 32.

Figure 3:
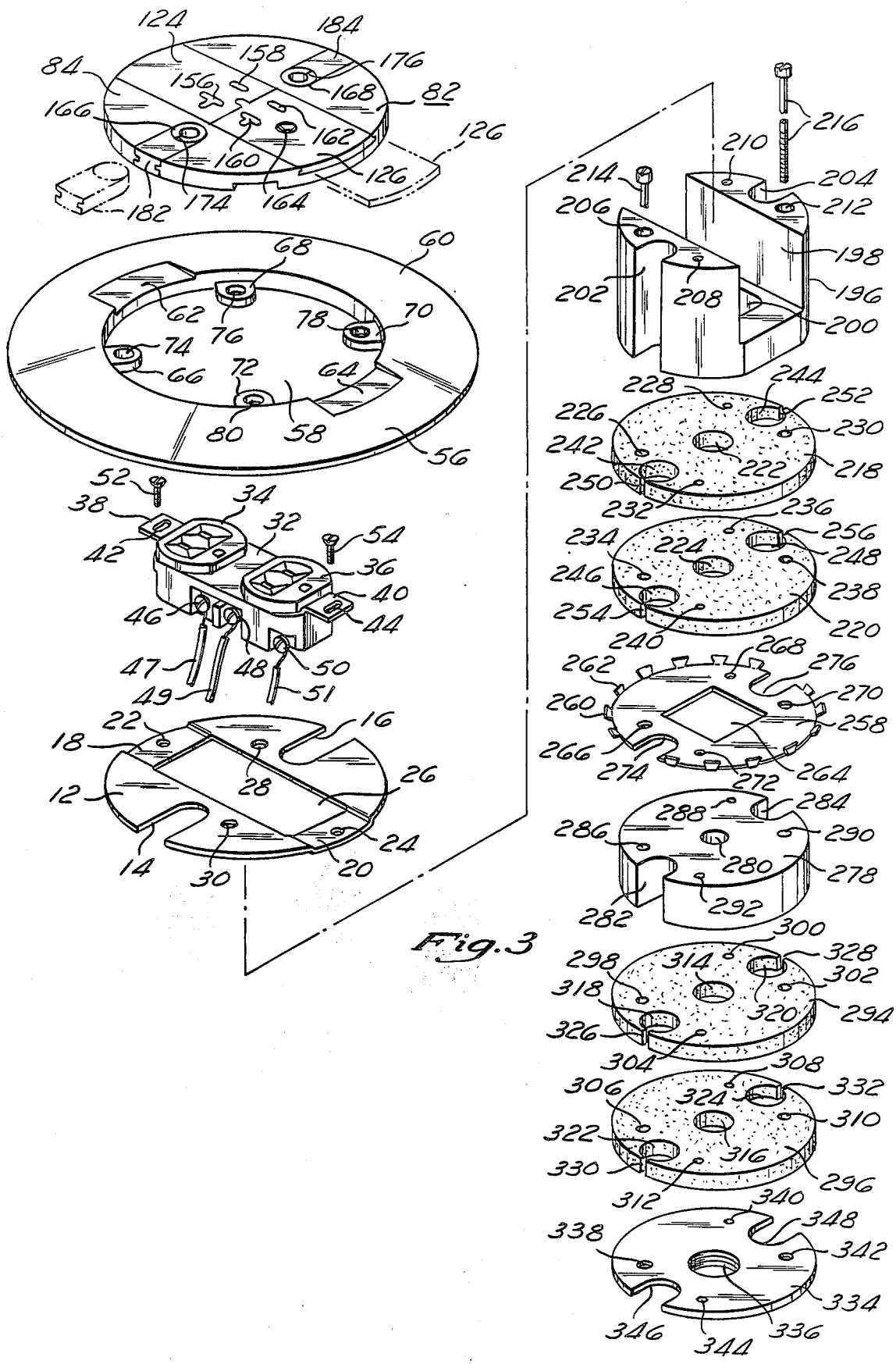
FIG. 3 is a perspective exploded view of the elements of the top portion and insert section of the fitting.

Slide holder 82 in the top portion of fitting 10, as shown in FIGS. 3 and 6, further includes ring-type grommets 166 and 168, comprised of flexible insulating material such as rubber. Each such grommet 166 and 168 has a central opening 170 and 172 adapted to enable low voltage conductors to pass therethrough, providing outlets therefor, a radial slit 174 and 176 extending for the length thereof, and a medial circular outwardly-opening recess 178 and 180 therein. Grommet medial recesses 178 and 180 are complementary to, and adapted to slidably interfit with, slide holder medial flanges 112 and 114. A pair of slot closures 182 and 184 each include medial side recesses 186, 188, 190 and 192, complementary to, and adapted to slidably engage with, slide holder medial flanges 112 and 114, and an inner end projecting flange portion, as 194, complementary to and adapted to engage medial recesses 178 and 180 in grommets 166 and 168.

Figure 2:
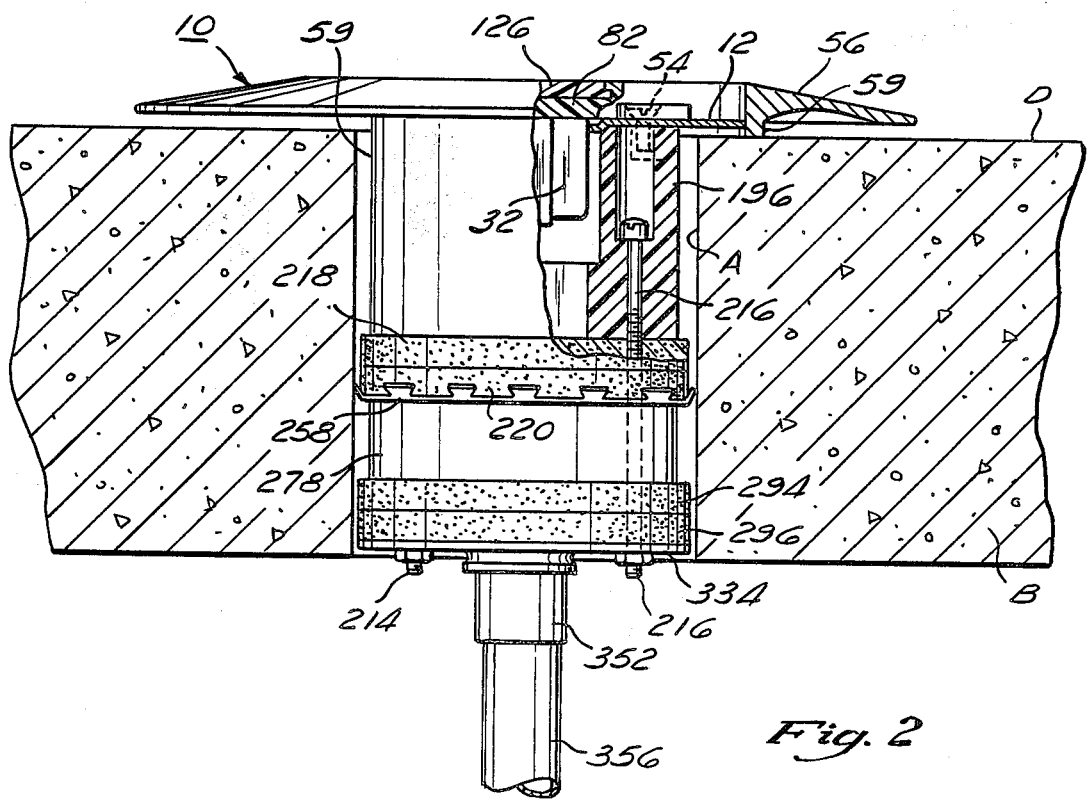
FIG. 2 is an elevational partly-fragmentary partly-sectional view thereof taken along line 2—2 of FIG. 1.

Fitting 10 further includes an insert section, as shown in FIGS. 1–3, adapted to be insertable in floor opening A, for withstanding excess heat and fire and preventing through-floor transmission thereof.

The insert section of fitting 10 includes an upper insulator 196, for absorbing and dissipating heat. Upper insulator 196 is generally tubular-shaped, and includes a central recess 198 for receiving receptacle 32 therein, and a medial opening 200 for enabling high voltage conductors, as 47, 49. and 51, to pass therethrough for connection to receptacle 32 at terminals 46, 48 and 50.

Upper insulator 196 further includes side generally C-shaped slots 202 and 204, along which the low voltage conductors may extend. It further includes openings 206, 208, 210 and 212, through which elongated screws, as 214 and 216, are extendable.

Upper insulator 196 is preferably comprised of a partially cured phenolic compound material, such as "Plenco 552", manufactured by Plastics Engineering Company, Sheboygan, Wis. "Plenco 552" is a thermosetting glass fiber reinforced phenolic compound, pelletized for improved moldability, which has improved impact and electrical properties, and dimensional stability and moldability.

A pair of intumescent members 218 and 220, which are generally disk-shaped, are positioned below upper insulator 196 in the insert section of fitting 10. Each such intumescent member 218 and 220 includes a central opening 222 and 224, for enabling pre-wired leads, as 47 and 49, to pass therethrough, and a plurality of openings 226, 228, 230, 232, 234, 236, 238 and 240, for enabling elongated screws, as 214 and 216, to extend therethrough for interconnecting upper insulator 196 and intumescent members 218 and 220. Each intumescent member further includes a pair of side generally C-shaped slots 242, 244, 246 and 248, which include side slits 250, 252, 254 and 256, adapted to receive low voltage conductors insertable therethrough.

The insert section of fitting 10 further includes a retainer member 258, for retaining fitting 10 in floor opening A. Retainer member 258 is generally diskshaped, and includes peripheral gripping portions, as 260 and 262, extending outwardly therefrom, for gripping floor opening A. It further includes a central opening 264 for enabling pre-wired leads, as 47, 49, and 51 to pass therethrough, and a plurality of openings 266, 268, 270 and 272, for enabling elongated screws, as 214 and 216, to extend therethrough for interconnecting retainer member 258 to the other elements of the medial section of fitting 10. Retainer member 258 further includes a pair of side generally C-shaped slots 274 and 276, in which low voltage conductors may extend.

A lower insulator 278 is positioned below retainer member 258 in the insert section of fitting 10, for absorbing and dissipating heat. Lower insulator 278 is generally disk-shaped, and, as upper insulator 196, is preferrably comprised of a partially cured phenolic compound material, such as "Pleneo 552" described previously herein regarding upper insulator 196, and includes a medial opening 280 for enabling pre-wired leads, as 47, 49, and 51 to pass therethrough.

Lower insulator 278 further includes side generally C-shaped slots 282 and 284, along which the low voltage conductors may extend. It further includes openings 286, 288, 290 and 292, and elongated screws, as 214 and 216, extendable therethrough.

The insert section of fitting 10 further includes a further pair of intumescent members 294 and 296, which are generally disk-shaped, and which are positioned below insulator member 278.

Intumescent members 218, 220, 294 and 296 are preferably comprised of an intumescent material, such as "ALVA-TECH Fire Barrier Sheet FB525" manufactured by Alva-Tech, Inc., Asbury Park, N.J. "ALVA-TECH Fire Barrier Sheet FB525" is an intumescent material which, when exposed to heat and flame, absorbs heat and begins to expand at a relatively low temperature (at about 250° F.). It expands in all directions rapidly and very substantially (for example, to about 1.5 times original size at about 250° F., and to about 6.3 times original size at about 500° F.), and the resultant flexible foam seals openings, forming an insulating barrier to retard the spreading of flames and to control temperature increase. It forms a very strong refractory char as the temperature continues to rise, which seals openings to form an efficient heat and smoke barrier, retarding transmission of heat and flame.

Each such intumescent member 294 and 296 includes a plurality of openings 298, 300, 302, 304, 306, 308, 310 and 312, for enabling elongated screws, as 214 and 216, to extend therethrough for interconnecting same to the other elements, and a central opening 314 and 316, for enabling pre-wired leads, as 47, 49, and 51 to pass therethrough. Each intumescent member further includes a pair of side generally C-shaped slots 318, 320, 322, and 324, which include side slits 326, 328, 330, and 332, adapted to receive low voltage conductors insertable therethrough.

A base plate 334 is positioned below intumescent member 296 in the insert section of fitting 10. Base plate 334 is generally disk-shaped, and includes a central threaded opening 336 for enabling pre-wired leads, as 47, 49, and 51, to pass therethrough, and a plurality of openings 338, 340, 342 and 344, for enabling elongated screws, as 214 and 216, to extend therethrough for interconnecting base plate 334 to the other elements of the insert section of fitting 10. Base plate 334 further includes a pair of side generally C-shaped slots 346 and 348, in which low voltage conductors may extend.

Fitting 10 still further includes a conduit extension 350, which includes a connector 352, threadably connected to central threaded opening 336 of base plate 334 of fitting 10, connector 354, and tube 356 secured at its ends to connectors 352 and 354. A junction box 358 in fitting 10 is adapted to enable connector 354 of conduit extension 350 to be connected thereto. High voltage leads, as 47, 49, and 51 are pre-wired so as to extend through the insert portion of fitting 10, and through encasing conduit extension 350, including connector 352, tube 354, and connector 356, into junction box 358 for enabling connection of underfloor high voltage conductors thereto and for enabling activation of receptacle 32.

Fitting 10 may be installed in the floor of a new structure to activate a selected location therein, so as to provide a substantially-flush top, excess heat and flame transmission retarding, in-floor outlet for underfloor high and low voltage conductors.

Initially, a hole may be drilled in the floor, such as a three-inch diameter core-drilled hole A formed in concrete slab fire-rated floor B, to form floor opening A at such selected location in floor B.

An insert assembly may then be inserted into floor opening A, as shown in FIGS. 1-2. The insert assembly may include a disposable floor plate (not shown) at the top thereof, the diameter of which is larger than the diameter of opening A, and may further include the insert portion of fitting 10, to the top of which the disposable floor plate is removably connected. The insert section includes upper insulator 202, intumescent members 218, 220, 294 and 296, retainer member 258, lower insulator 278, and base plate 334 secured together by elongated screws, as 214 and 216, as shown in FIGS. 2 and 3. The insert assembly may further include the conduit extension of fitting 10 which depends from the bottom of the insert portion thereof, and junction box 358 connected to the conduit extension of fitting 10. Pre-wired high voltage leads 47, 49, and 51, each connected at one end thereof in junction box 358, extend therefrom through the conduit extension and insert section of fitting 10, with the free ends thereof extending into insert section upper insulator central recess 198 for enabling connection thereof to receptacle 32.

The gripping portions, as 260 and 262 of retainer member 258 in the insert portion of fitting 10, are slidably compressable, enabling fitting 10 to be pushed into floor opening A until the disposable floor plate is seated on floor B, with such gripping portions, as 260 and 262 of retainer member 258, engaging the wall of floor opening A, thereby automatically positioning and securing the insert assembly of fitting 10 in position in floor opening A.

High voltage conductors in the plenum below floor B may then be spliced and connected to junction box 358, to which pre-wired high voltage leads, as 47, 49, and 51 are connected. Such high voltage through-wiring leads, as 47, 49, and 51 are pre-wired so as to extend through the insert section of fitting 10, and conduit extension 350, into junction box 358.

The floor covering, as carpet C, may then be installed on floor B, and a concentric hole may be cut in carpet C at the desired location, using the disposable floor plate as a template. The disposable floor plate may then be disconnected from the top of the insert section of fitting 10 and may then be discarded, the insert section being retained in floor opening A by retainer member 258.

The finish flange section of fitting 10, which includes flange plate 12, receptacle 32, and finishing ring 56, may then be held so that the terminals 46, 48 and 50 in receptacle 32 are accessible, and the pre-wired high voltage leads 47, 49, and 51 may then be attached to receptacle terminals 46, 48, and 50.

The wired finish flange section may then be placed over the exposed insulator insert 196, with openings 28 and 30 of flange plate 12 aligned with openings 210 and 208 of insulator insert 196, and screws (not shown) may then be threaded therethrough so as to secure the finish flange section to the retained insert section of fitting 10. The circular edge of the concentric hole cut in carpet C is thereby completely concealed by the circular flange portion 60 of finishing ring 56.

A slide holder assembly, which includes slide holder 82, slide plates 124 and 126, biasing springs 140, 142, 144 and 146, grommets 166 and 168, and slot closures 182 and 184, may then be inserted into circular opening 58 of finishing ring 56 with the peripheral recesses 100, 102, 104 and 106 in the bottom of slide holder 82 seated in support portions 66, 70, 72 and 74 in finishing ring 56. One slide member, as 126, may then be retracted, as shown in dashed lines in FIG. 3, to insure that the openings 160, 162 and 164 therein align with the openings 36 in receptacle 32—if not, slide holder 82 may be rotated 180°. Screw 94 may then be threaded through central opening 92 in slide holder 82, and through a central opening (not shown) in the top of receptacle 32, thereby securing the slide holder assembly to the insert assembly of fitting 10.

Slide holder 82 initially is provided with slot closures which include break-off plug ends (not shown) to cover such slots 108 and 110 when no low voltage conductors extend through fitting 10.

To install a pair of low voltage conductors in fitting 10 in the floor of the new structure, prior to securing the slide holder assembly to the insert assembly of fitting 10, the initially-provided solid slot closures are removed from slide holder side slots 108 and 110, and the separable plug ends thereof are broken off and discarded, leaving the slot closures in the form of 182 and 184. The ring-type grommets 166 and 168 are then seated in the slide holder side slots 108 and 110, and slot closures 182 and 184 are then seated therein. The low voltage conductors, as for example communication or data cables, may then be pulled from an underfloor source thereof and introduced through side channels therefor formed by the aligned side slits and slots in the insert section of fitting 10, and through slide holder grommets 166 and 168. The slide holder assembly may then be secured to the insert assembly of fitting 10.

Fitting 10 may alternatively be retrofitted, as a fully assembled unit, in the fire-rated floor of an existing structure in which a carpet, as C, has already been installed on the floor. Such retrofitting enables activation of a selected location in floor therein, so as to provide a substantially-flush top, excess heat and flame transmission retarding, in-floor outlet for underfloor high and low voltage conductors.

Initially a hole is cut in carpet C. A concentric hole may then be drilled in floor B, such as a three-inch diameter core-drilled hole A formed in concrete slab floor B, to form floor opening A at such selected location in floor B.

Existing low voltage wiring may be installed in the fully assembled fitting 10, without disconnecting or unplugging thereof. Such writing may be introduced through side slits 174 and 176 in grommets 166 and 168, through side slits 250, 252, 254, 256, 326, 328, 330 and 332 in intumescent members 218, 220, 294 and 296. This enables existing wiring to extend through the side channels formed by the aligned side slits and slots in the insert section and through the grommets 166 and 168 in side holder 82 of fitting 10.

The fully assembled fitting 10, including the assembled top section which includes slide holder 82, finishing ring 56, receptacle 32, pre-wired leads 47, 49, and 51 and flange plate 12, the insert section, including upper and lower insulator 196 and 278, intumescent members 218, 220, 294, and 296, retainer member 258, and bottom plate 334, the extension conduit 356, including connectors 352 and 354 and tube 356, and the junction box 358, secured together with the existing low voltage wiring extending therethrough may then be pushed into floor opening A until the bottom of finishing ring 56 is seated on floor B, with the gripping portions, as 260 and 262, of retainer member 258, engaging the wall of floor opening A, thereby automatically positioning and securing the fitting assembly in position in floor opening A.

High voltage conductors in the plenum below floor B may then be spliced and connected to junction box 358, to which pre-wired high voltage leads, as 47, 49, and 51 are connected.

Screw 94, below slide plates 124 and 126, may then be accessed and unthreaded, thereby disconnecting slide holder 82 from receptacle 32. The ring-type grommets 166 and 168 and slot closures 182 and 184 may then be installed in slide holder slots 108 and 110 as described above for installation in a new structure, and screw 94 may be re-threaded so as to secure slide holder 82 to receptacle 32.

Slide plates 124 and 126 are normally biased by biasing springs 140, 142, 144 and 146 so as to close together, as shown in FIGS. 1 and 3, with openings 156 and 158, and openings 160, 162 and 164, out of alignment with the outlet openings 34 and 36 in receptacle 32, thereby covering and abandoning the power conductor portion of fitting 10, without requiring an abandoning plate.

Slide plates 124 and 126 may be retracted manually to positions where openings 156, 158, 160, 162 and 164 are aligned with corresponding outlet openings 34 and 36 in receptacle 32, enabling a plug or plugs from a high voltage conductor or conductors to be plugged into receptacle 32 for activation of devices to which such conductor or conductors are connected.

Upon being exposed to excess heat or flame rising from below floor B into floor opening A in which fitting 10 is installed, elements in fitting 10 operate in stages to retard and prevent transmission of such excess heat and flame through fitting 10 and floor oopening A, and to dissipate such excess heat and flame, such that the fire-rating of floor B with floor opening A formed therein and fitting 10 positioned therein is substantially the same as the fire-rating of floor B without floor opening A formed therein.

Intumescent members 294 and 296 are the first elements in fitting 10 to be exposed to such underfloor excess heat or flame, and such members intumesce and expand under pressure in all directions, including radially outwardly to the wall of floor opening A, and radially inwardly to the wires of the conductors which pass through fitting 10, so as to seal floor opening A and the conductors extending through fitting 10, as a first stage in retarding and preventing transmission of excess heat or flame through fitting 10 and floor opening A.

Lower insulator 278, and intumescent members 218 and 220 are the next elements in fitting 10 to be exposed to such excess heat or fire. The partially cured phenolic compound of which lower insulator 278 is comprised absorbs heat and undergoes completion of the curing process and cross-linking, producing water which cools fitting 10, dissipating heat, and further preventing the transmission of heat or flame through fitting 10 and floor opening A. Intumescent members 218 and 220 are next to be exposed to such excess heat or flame, and thereupon intumesce and expand in all directions under pressure, expanding radially outwardly to the wall of floor opening A and radially inwardly to the wires of the conductors which pass through fitting 10, to then further seal the floor opening A and conductors extending through fitting 10.

Upper insulator 196 is the last fire retarding element in fitting 10 to be exposed to excess heat or flame. The partially-cured phenolic compound of which upper insulator 196 is comprised, as for lower insulator 278, absorbs heat and undergoes completion of the curing process and cross-linking, producing water which cools fitting 10, and dissipates heat, still further preventing the transmission of excess heat or flame through fitting 10 and floor opening A.

Slide holder 82 and circular flange portion 60, constituting the top portion of fitting 10, provide a substantially flush outlet in fitting 10 for conductors, for activation of devices adapted to be activated thereby, without a box-like doghouse-type above-floor service fitting therefor, enhancing the safety thereof by preventing such obstruction of the floor, and providing an aesthetically appealing device.

Upper insulator 196, intumescent members 218, 220, 294 and 296, and lower insulator 278 in fitting 10 are activated in stages upon exposure thereof to excess heat or flame, and retard and prevent transmission of such excess heat or flame through fitting 10 and floor opening A, thereby enabling the fire rating of floor B with floor opening A formed therein and fitting 10 positioned therein to be substantially the same as the fire rating of floor B without floor opening A formed therein.

Slide plates and biasing springs 140, 142, 144, and 146 in fitting 10 enable receptacle 32, which is the high voltage conductor receiving portion of fitting 10, to be normally and automatically closed and covered for abandonment thereof when not in use, without an abandonment plate.

Slide slots 14, 16, 274, 276, 282, 284, and 346 and 348, central openings 170 and 172, side openings 242, 244, 246, 248, 318, 320, 322 and 324, and side slits 174, 176, 250, 252, 254, 256, 326, 238, 330, and 332 in the elements of fitting 10 enable low voltage conductors to be fitted or retrofitted in fitting 10.

Pre-connected lead wires, as 47, 49, and 51 in fitting 10, enable convenient and efficient connection of high voltage conductors by splicing same in junction box 358 for activating receptacle 32.

Preferred embodiments of the device of the invention have been set forth above, for the purpose of explaining the invention. However, it is to be understood that variations may be made in such embodiments, which variations are nevertheless within the scope and spirit of the invention as set forth in the claims herein.

We claim:

1. A fitting for enabling at least one conductor to extend thereto or therethrough, adapted to be supported in an opening formed in a fire-rated floor, which conductor is adapted to be extendable from an underfloor source thereof to or through the fitting to the top of the floor for enabling activation of a device thereby, and which fitting is adapted to provide an outlet for such conductor without an above-floor service fitting, and is further adapted such that the fire rating of the floor with the floor opening formed therein and with the fitting positioned therein is substantially the same as the fire rating of the floor without the floor opening formed therein, comprising:

(a) a top portion, adapted to extend above the floor so as to be substantially flush with the top of a carpet adapted to be installed on the floor, which top portion is adapted to provide an outlet for such conductor, without an above-floor service fitting; and (b) means for preventing the transmission of heat and flame through the fitting and through the floor opening, adapted to enable the fire-rating of the floor with the floor opening formed therein and with the fitting positioned therein to be substantially the same as the fire-rating of the floor without the floor opening formed therein, comprising means for sealing the floor opening and the conductor passing through the fitting, adapted to intumesce and expand under pressure.

2. A fitting as in claim 1, in which the top portion includes a receptacle adapted to receive at least one plug projecting from the end of a high voltage conductor, for enabling activation of at least one device thereby, which fitting further comprises a junction box, adapted to enable connection of at least one underfloor high voltage conductor thereto and to at least one high voltage conductor pre-wired in the fitting and interconnecting the receptacle and the junction box.

3. A fitting as in claim 1, adapted to be pre-set in the floor.

4. A fitting as in claim 1, adapted to be after-set in the floor.

5. A fitting as in claim 1, in which the conductor adapted to extend through the fitting is a low voltage conductor.

6. A fitting as in claim 1, in which the conductor adapted to extend to the fitting is a high voltage conductor.

7. A fitting as in claim 1, in which the heat transmission preventing means comprise means for insulating the fitting, adapted to absorb and dissipate heat.

8. A fitting as in claim 7, in which the insulating means are comprised of a phenolic compound material.

9. A fitting as in claim 1, in which the top portion includes a receptacle adapted to receive at least one plug projecting from the end of a high voltage conductor, for enabling activation of at least one device thereby, and means, normally closed so as to cover the receptacle, for enabling connection of at least one high voltage conductor plug to the receptacle upon opening thereof from the normally closed receptacle-covering position.

10. A fitting as in claim 9, in which the receptacle has openings therein adapted to receive mating portions of the high voltage conductor plug, and the normally-closed connection-enabling means comprise a track in the top portion, at least one plate, adapted to be slidable in the top track, having openings formed therein adapted to be alignable with the openings in the receptacle, and means for biasing the plates into normally-closed position relative to the receptacle so as to normally cover the receptacle openings.

11. A fitting as in claim 1, further comprising means for enabling at least one low voltage conductor to be fitted or retrofitted thereinto, for enabling activation of at least one device thereby.

12. A fitting as in claim 11, in which the fit enabling means comprise at least one slot formed along at least one side of the fitting, adapted to form at least one side channel in the fitting in which the low voltage conductor is adapted to be fitted or retrofitted.

13. A fitting as in claim 1, in which the heat transmission preventing means comprise a plurality of means adapted to expand under pressure upon exposure to increased heat so as to seal the floor opening and the conductor passing through the fitting and prevent the transmission of heat through the fitting.

14. A fitting as in claim 13, in which the heat transmission preventing means further comprise means for insulating the fitting, adapted to absorb and dissipate the increased heat, positioned intermediate the plurality of expanding eans.

15. A fitting for enabling a plurality of conductors to extend thereto or therethrough, adapted to be supported in an opening formed in a fire-rated floor, which conductors are adapted to be extendable from an underfloor source thereof to or through the fitting to the top of the floor for enabling activation of devices thereby, and which fitting is adapted to provide an outlet for such conductors without an above-floor service fitting, and is further adapted such that the fire rating of the floor with the floor opening formed therein and with the fitting positioned therein is substantially the same as the fire rating of the floor without the floor opening formed therein, comprising:

(a) a top portion, adapted to extend above the floor so as to be substantially flush with the top of a carpet adapted to be installed on the floor, which top portion is adapted to provide an outlet for such conductors, without an above-floor service fitting; and (b) means for preventing the transmission of heat and flame through the fitting and through the floor opening, adapted to enable the fire-rating of the floor with the floor opening formed therein and with the fitting positioned therein to be substantially the same as the fire-rating of the floor without the floor opening formed therein, comprising means for sealing the floor opening and the conductor passing through the fitting, adapted to intumesce and expand under pressure.

16. A fitting as in claim 15, in which the plurality of conductors adapted to extend through the fitting comprise at least one low voltage conductor, and at least one high voltage conductor.

* * * * *